March 25, 1958     C. F. HAUNZ     2,828,349
STORAGE BATTERY
Filed May 11, 1953
FIG. 1
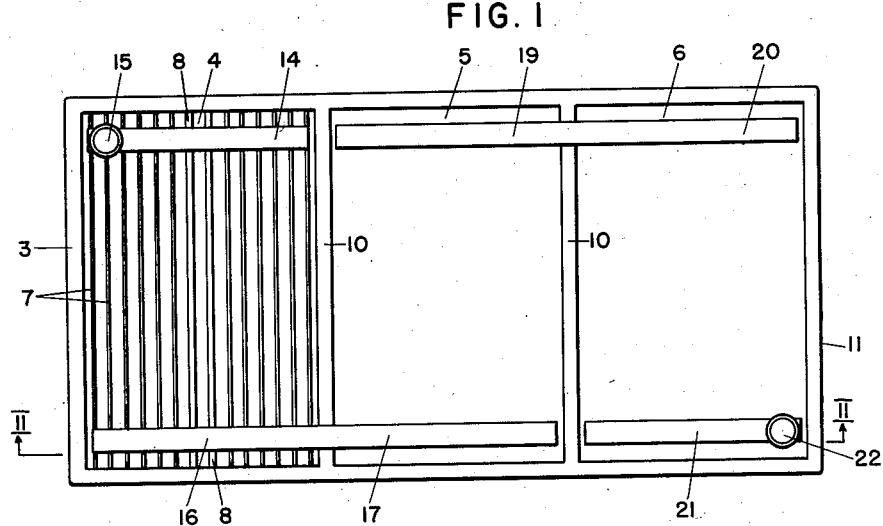
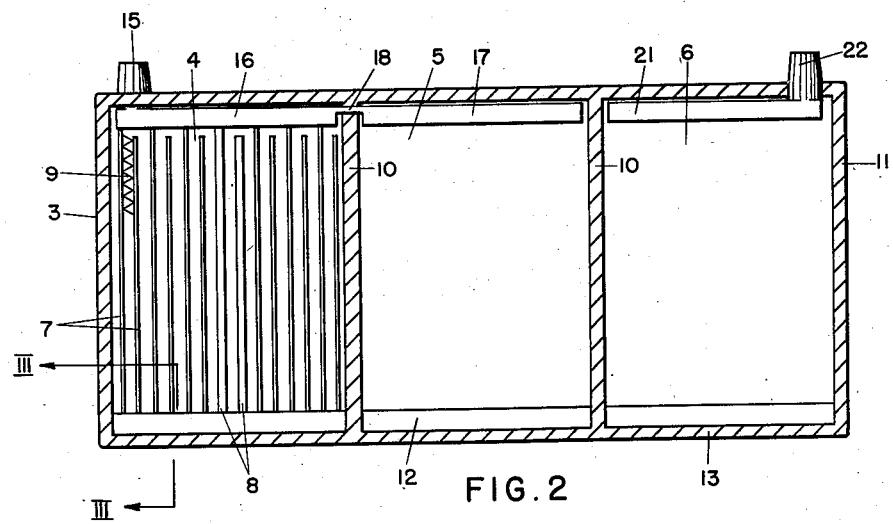
FIG. 2
FIG. 3
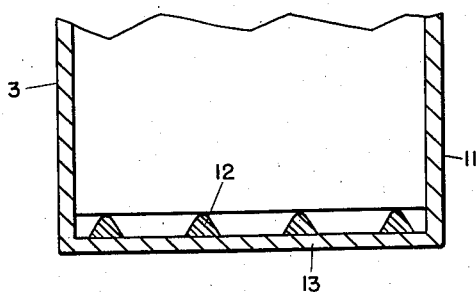
INVENTOR.
Charles F. Haunz
BY

United States Patent Office 2,828,349
Patented Mar. 25, 1958

2,828,349

STORAGE BATTERY

Charles Frederick Haunz, Charlotte, N. C., assignor to Pneumafil Corporation, Charlotte, N. C., a corporation of Delaware Application May 11, 1953, Serial No. 354,305

3 Claims. (Cl. 136—16)

This invention relates to storage batteries of the type used in automobiles, railways, aeroplanes and other machines.

The general object of the invention is to provide a simple and inexpensive arrangement of battery plates which will improve the performance and impart longer life to an ordinary storage battery of the type used for starting engines of all types.

A feature of the invention resides in the provision of thick battery plates having twice the capacity in combination with the usual thin plates employed in each cell of the battery.

Another feature provides a simple arrangement for connecting the plates of a battery and the adjoining cells. This dispenses with the heavy cross bars now used on top of the conventional battery in making internal connections.

Other features are apparent from the following description of one form of the invention to be read in connection with the accompanying drawings in which:

Figure 1 is a plan view, in diagrammatic form, of a battery equipped with my cell and internal strap connecting means;

Figure 2 is a sectional view taken on the line II—II of Figure 1, of the battery arrangement; and Figure 3 is a sectional view taken on the line III—III of Figure 2.

Considering the drawings, similar designations referring to similar parts, 3 refers to a storage battery casing of conventional form comprising three cells 4, 5 and 6. The cells are substantially identical so far as arrangement of plates therein is concerned.

Considering cell 4, a plurality of thin plates 7 are positioned within the cell, the thickness of said plates being of the order of 3/32" but preferably not in excess of such thickness dimension. In addition to the usual thin plates 7, applicant provides two thick plates 8 whose cross sectional dimension is of the order of 3/16" but may be somewhat in excess thereof according to desired capacity.

As shown, two thin plates contiguous to one another are oppositely charged; and the two thick plates are oppositely charged.

The spacing between the plates is uniform and dividers 9 serve to interposition the plates and retain them in rigid relationship equally spaced from one another with suitable insulation separators.

The acid solution is of normal strength in each of the cells. Partitions 10 divide the battery casing into the three cell compartments, and the height of said partitions is somewhat less than the height of the size of the battery 11.

In each cell applicant provides a plurality of blocks 12, generally triangular in shape, made of acid resisting material, usually of the same material as that of the casing or dividers. These blocks serve to support the plates above the bottom 13 of the battery so that good circulation of the acid solution may take place in and around and between the plates.

In order to eliminate the heavy and expensive outside cross bars now usually provided in storage batteries, applicant substitutes a relatively simple and inexpensive connecting strap arrangement. As shown in Figure 1, negative strap 14 made of lead or alloy material, such as a lead strap of minimum weight, connects to the top of all of the negative plates in one end of cell 4 and leads to negative terminal 15. At the other end of cell 4 is provided a similar but positive strap 16 attached to the opposite end of all of the positive plates of cell 4 and then leading to a connecting strap, connecting negative strap 17 of cell 5. As shown in Figure 2, strap 16 connected to all positive plates of cell 4 connects to the continuation thereof, constituting strap 17 which is connected to all of the negative plates of cell 5. The interconnection of straps 16 and 17 is made by a link 18 which spans notched partition 10 which, as before described, is less in height than the sides of the battery.

Similarly, positive strap 19 connecting to the positive plates of cell 5 is continued and connects with negative strap 20 which serves the negatively charged plates of cell 6; the structure of straps 19 and 20 being the same as that of 16 and 17. Positive strap 21 connects to the positive plates of cell 6 and is attached to positive terminal 22.

Normal battery covers are applied completing the separation of the cells and covering the battery.

The use of a pair of thick plates in each cell whose cross section is substantially twice that of the conventional thin plates results in a battery having a longer life and adapted to give better service. The thick plates, in practice, retain their charge over a longer period of time and have a capacity substantially twice that of the thin plates. As a result, the booster effect of the thick plates enables the battery effectively to function when the thin plates are run down and need time again to build up a charge.

Of course, any number of cells may be employed to provide batteries of requisite size; but each cell should be provided with the pair of oppositely charged plates as heretofore described.

The internal strap arrangement is incorporated beneath the top of the battery and hence eliminates the costly construction now employed wherein exterior heavy plates are required. The strap arrangement conveniently connects plates having one charge to plates of a contiguous cell oppositely charged. The structure of the battery is not radically changed although the expense of making the connections is substantially reduced.

Thus, applicant affords a simple structure at reduced expense giving a longer life to a conventional storage battery.

The addition of applicant's thick plates provides added capacity which enables the battery to give satisfactory service when extraordinary drain reduces the charge on the conventional thin plates.

It will be apparent that changes may be made in the arrangement of plates, in the positioning of the thick plates, whether in the center or otherwise located within the cell; in the structure of the straps and the location within the battery housing. Thus, applicant is not limited by the precise showing in the drawings and reserves the right to employ alternative structures.

I claim:

1. A wet cell storage battery including a cell, a number of thin plates of negative polarity and a number of thin plates of positive polarity within said cell, and a pair of plates substantially thicker than said thin plates in the cell, said pair of plates being contiguous to one another, one of said thicker plates being electronically connected to said thin plates of negative polarity and the other of said thicker plates being electronically connected to said thin plates of positive polarity, whereby the thick plates permit the battery to function when the thin plates have lost their charge.

2. In a wet cell storage battery, a plurality of cells, each of the cells containing a number of thin plates of negative polarity and a number of thin plates of positive polarity and a pair of oppositely charged plates substantially twice as thick as the thin plates, one of said thicker plates electronically connected to the thin plates of negative polarity and the other of said thicker plates being electronically connected to said thin plates of positive polarity to permit the battery to give the necessary service when extraordinary drain reduces the thin plate charge.

3. In an electrical battery having a liquid electrolyte, a plurality of cells, each of the cells containing a number of plates having a thickness of about 3/32" and a pair of plates having a charge opposite to each other of a thickness of about 3/16".

References Cited in the file of this patent
UNITED STATES PATENTS

| | | |
|---|---|---|
| 719,871 | Reed | Feb. 3, 1903 |
| 738,718 | Fiedler | Sept. 8, 1903 |
| 1,437,983 | Meyer et al. | Dec. 5, 1922 |
| 1,483,091 | Imblum | Feb. 12, 1924 |
| 1,611,532 | Kastelic | Dec. 21, 1926 |
| 1,692,316 | Smith | Nov. 20, 1928 |
| 2,416,576 | Franz et al. | Feb. 25, 1947 |
| 2,649,492 | Linton et al. | Aug. 18, 1953 |

OTHER REFERENCES

"Storage Batteries"—Vinal 1924 Ed., pages 183–195.